US007162282B2

(12) United States Patent
Engstrom et al.

(10) Patent No.: US 7,162,282 B2
(45) Date of Patent: *Jan. 9, 2007

(54) INTERCHANGEABLE COVERING ADDITIONS TO A MOBILE COMMUNICATION DEVICE FOR DISPLAY AND KEY REORIENTATION

(75) Inventors: G. Eric Engstrom, Kirkland, WA (US); Peter Zatloukal, Kirkland, WA (US)

(73) Assignee: Wildseed, Ltd., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/738,852

(22) Filed: Dec. 17, 2003

(65) Prior Publication Data

US 2004/0132492 A1     Jul. 8, 2004

Related U.S. Application Data

(63) Continuation-in-part of application No. 10/346,017, filed on Jan. 16, 2003, which is a continuation-in-part of application No. 09/767,526, filed on Jan. 22, 2001, now abandoned, and a continuation-in-part of application No. 10/087,098, filed on Mar. 1, 2002, now abandoned, and a continuation-in-part of application No. 09/932,154, filed on Aug. 17, 2001, now Pat. No. 6,721,545.

(60) Provisional application No. 60/306,326, filed on Jul. 17, 2001, provisional application No. 60/292,123, filed on May 17, 2001.

(51) Int. Cl.
    *H04M 1/00*     (2006.01)
(52) U.S. Cl. .................. 455/575.3; 455/90.3; 455/566; 455/575.8; 379/433.04

(58) Field of Classification Search ............... 455/90.1, 455/90.2, 550.1, 575.1, 90.3, 566, 575.2, 455/556.2, 575.8, 558, 557; 345/156, 164, 345/168, 173; 379/433.04
See application file for complete search history.

(56) References Cited

U.S. PATENT DOCUMENTS

| 4,723,305 | A | | 2/1988 | Phillips et al. |
| 5,586,168 | A | | 12/1996 | Bucalo et al. |
| 5,661,632 | A | * | 8/1997 | Register .................... 361/683 |
| 5,703,932 | A | | 12/1997 | Oda |
| 5,758,267 | A | * | 5/1998 | Pinder et al. ............... 455/90.2 |
| 5,987,336 | A | * | 11/1999 | Sudo et al. .................. 455/566 |
| 6,047,196 | A | * | 4/2000 | Makela et al. ............ 455/556.1 |
| 6,107,988 | A | * | 8/2000 | Phillipps ..................... 345/156 |
| 6,144,847 | A | | 11/2000 | Altschul et al. |
| 6,208,874 | B1 | | 3/2001 | Rudisill et al. |
| 6,246,862 | B1 | | 6/2001 | Grivas et al. |
| 6,259,896 | B1 | | 7/2001 | Sepponen |
| 6,373,501 | B1 | | 4/2002 | Fiero |
| 6,593,914 | B1 | * | 7/2003 | Nuovo et al. ............... 345/169 |
| 6,658,272 | B1 | * | 12/2003 | Lenchik et al. ............. 345/164 |
| 6,798,882 | B1 | * | 9/2004 | Kupiainen ............. 379/433.04 |
| 6,999,804 | B1 | * | 2/2006 | Engstrom et al. ........ 455/575.3 |
| 2002/0037738 | A1 | * | 3/2002 | Wycherley et al. ......... 455/550 |
| 2003/0044000 | A1 | * | 3/2003 | Kfoury et al. ......... 379/433.04 |
| 2006/0063571 | A1 | * | 3/2006 | Chadha ................... 455/575.3 |

FOREIGN PATENT DOCUMENTS

DE          297 10924        6/1997

(Continued)

*Primary Examiner*—Charles N. Appiah
(74) *Attorney, Agent, or Firm*—Schwabe, Williamson & Wyatt, P.C.

(57) ABSTRACT

A mobile communications device including an interchangeable covering addition for display and key reorientation is provided.

24 Claims, 13 Drawing Sheets

| | FOREIGN PATENT DOCUMENTS | | | WO | WO/99/44346 | 9/1999 |
|----|----|----|----|----|----|----|
| GB | 2 355 126 A | * | 4/2001 | | | |
| JP | 1131991 | | 11/1999 | * cited by examiner | | |

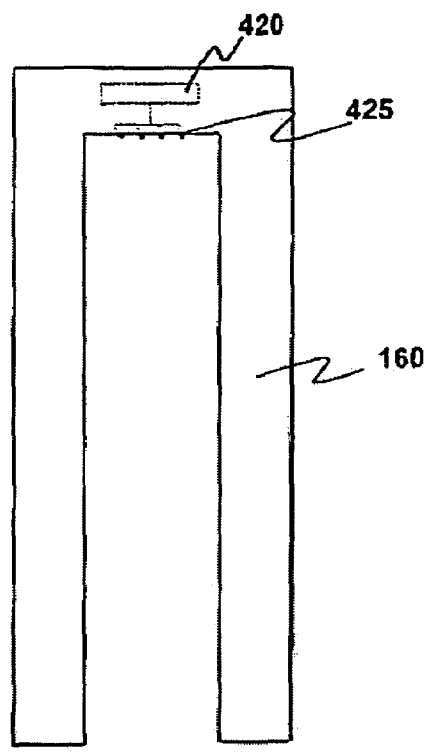
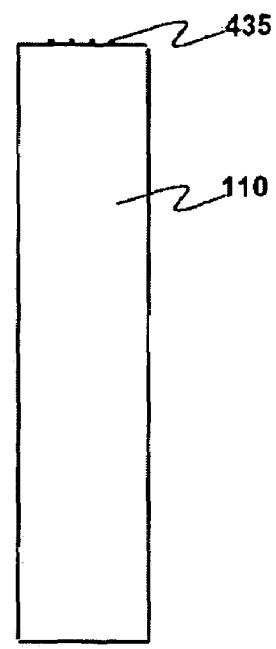
Figure 4B
Figure 4A
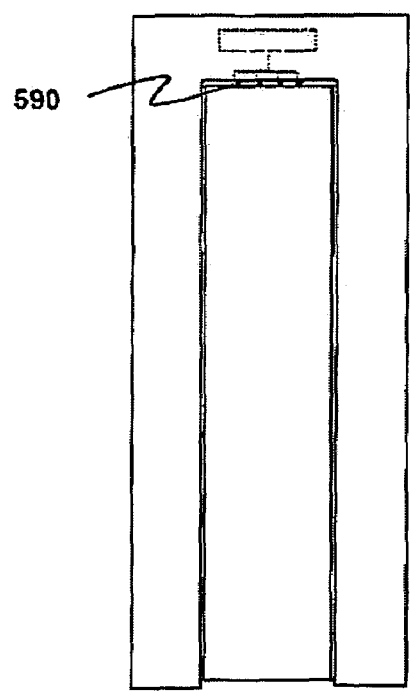
Figure 5

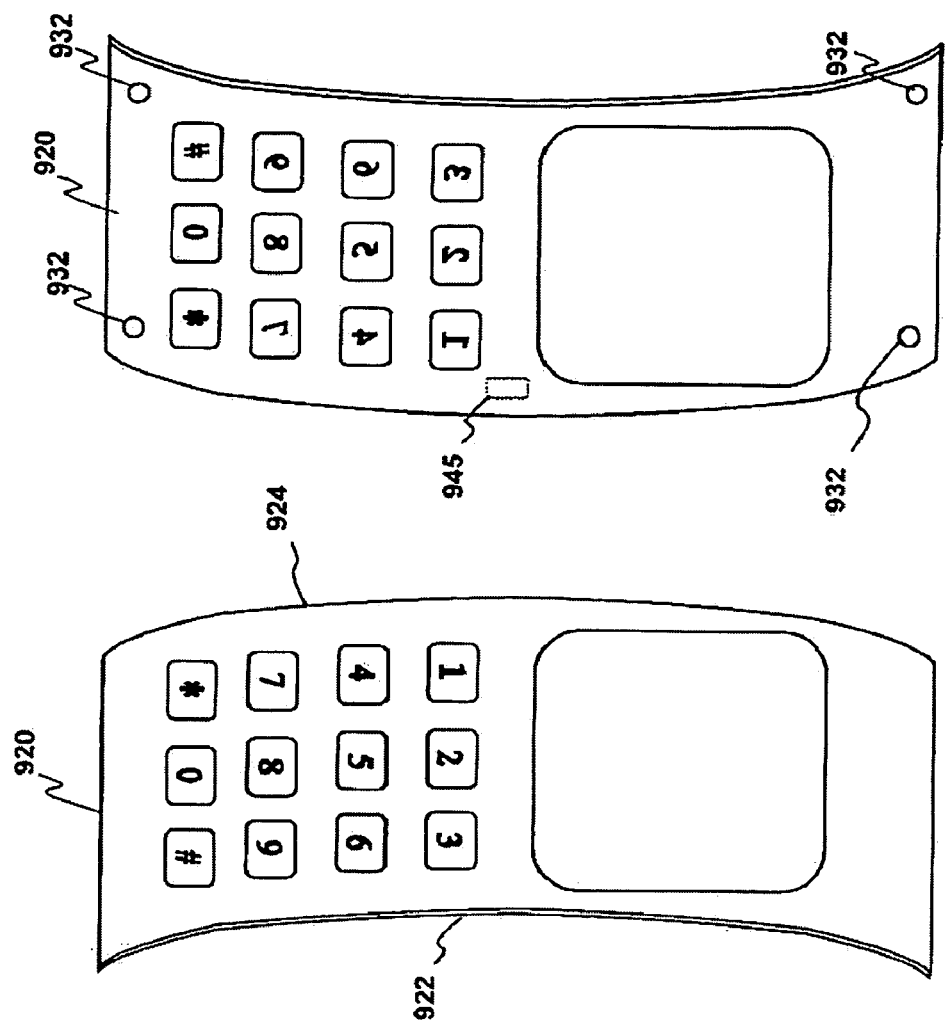
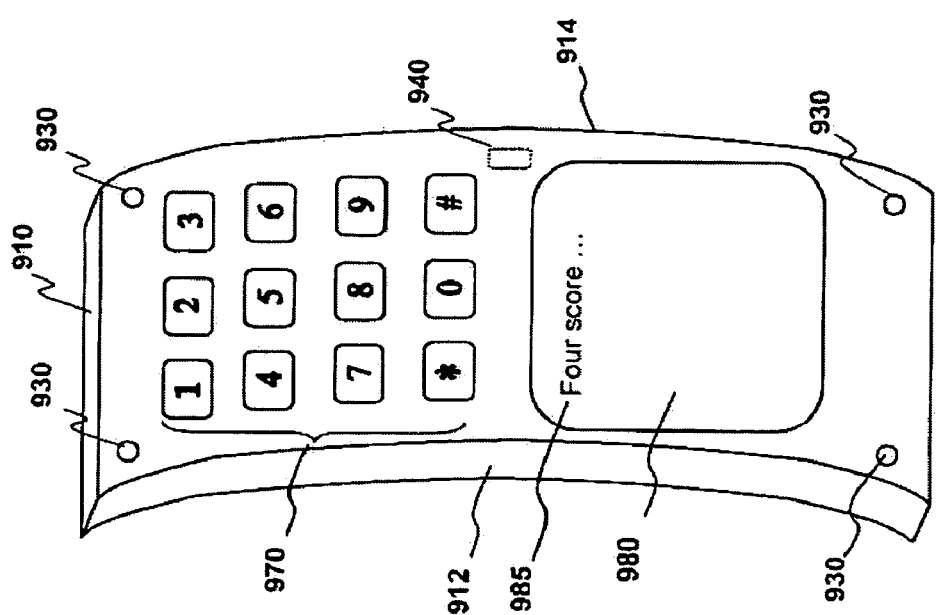
Figure 9C
Figure 9B
Figure 9A

INTERCHANGEABLE COVERING ADDITIONS TO A MOBILE COMMUNICATION DEVICE FOR DISPLAY AND KEY REORIENTATION

RELATED APPLICATION

This application is a continuation-in-part application, claiming priority to U.S. patent application Ser. No 10/346,017, filed on Jan. 16, 2003, entitled Interchangeable Covering Additions to a Mobile Communication Device for Display and Key Reorientation, which itself is a continuation-in-part application, claiming prior to (a) U.S. patent application Ser. No. 09/767,526, filed Jan. 22, 2001, now abandoned entitled "A Wireless Mobile Phone with Inverted Placement of Antenna and Input Keypad";

(b) U.S. patent application Ser. No. 10/087,098, filed Mar. 1, 2002, now abandoned entitled "Personalizing Electronic Devices and Smart Covering", which itself claims priority to its provisional filing No. 60/306,326, on Jul. 17, 2001; and (c) U.S. patent application Ser. No. 09/932,154, filed Aug. 17, 2001, now U.S. Pat. No. 6,721,545 entitled "Mobile Electronic Device and Covering for Similar Devices with Ornament Attachment Mechanism", which itself claims priority to its provisional filing No. 60/292,123, on May. 17, 2001.

BACKGROUND OF THE INVENTION

1. Field of the Invention

The invention relates to the field of portable electronic devices. More specifically, the present invention relates to modification of portable electronic devices through the use of device coverings.

2. Background Information

Mobile communications devices, such as cellular phones, wireless-enabled personal digital assistants (PDAs), and two-way pagers, have become very prevalent in many of regions of the world, such as the United States, Asia, and Europe. There are many different configurations of mobile communications devices depending on the application for use on the mobile communications device, current conditions surrounding the use of the mobile communications device or the personal preferences of the user using the mobile communications device.

The personal preference of the user of the mobile communications is one factor driving the different configurations of mobile communications devices. For example, with wireless-enabled PDAs some users prefer the use of a stylus to "hand write" information for entry into the wireless-enabled PDAs. In contrast, other users prefer that a wireless-enabled PDA contain a miniaturized QWERTY keyboard to facilitate the entry of data. Note that, at times, different users with different person preferences may share use of a mobile communications device.

Certain environmental conditions may effect the desired user of a mobile communications device. For example, a user may have a preference to use a mobile communications device with a keypad located below the display device. However, under particularly sunny conditions, the user may decide that having the keypad above the display, so that the shadow from the hand on the keypad blocks direct sunlight, is a more desirable configuration.

Mobile communications device may be loaded with a number of different applications. For example, a mobile communications device may be used in a configuration as a wireless mobile telephone. In such a case the most desirable input method is via a traditional numeric input keypad found on most wireless mobile telephones. At a second time, however, a mobile communications device may be used to record notes at a meeting attended by the user. In this usage mode, it is more desirable to have a traditional QWERTY keyboard for entering data.

Thus, various factors determine the desired method of interaction with today's mobile communications devices.

BRIEF DESCRIPTION OF THE DRAWINGS

FIGS. 4A and 4B illustrate a top view of a mobile communications device and an interchangeable covering, respectively, in accordance with one embodiment.

FIG. 5 illustrates a top view of a mobile communications device and an interchangeable covering joined.

FIG. 9A illustrates a mobile communications device, in accordance with one embodiment.

FIGS. 9B and 9C illustrate an interchangeable covering for the mobile communications device of FIG. 9A.

DETAILED DESCRIPTION OF THE PREFERRED EMBODIMENTS

Embodiments of an interchangeable covering for use with mobile communication devices such as cellular phones, wireless PDAs, two-way pagers and pocket PCs are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1B:
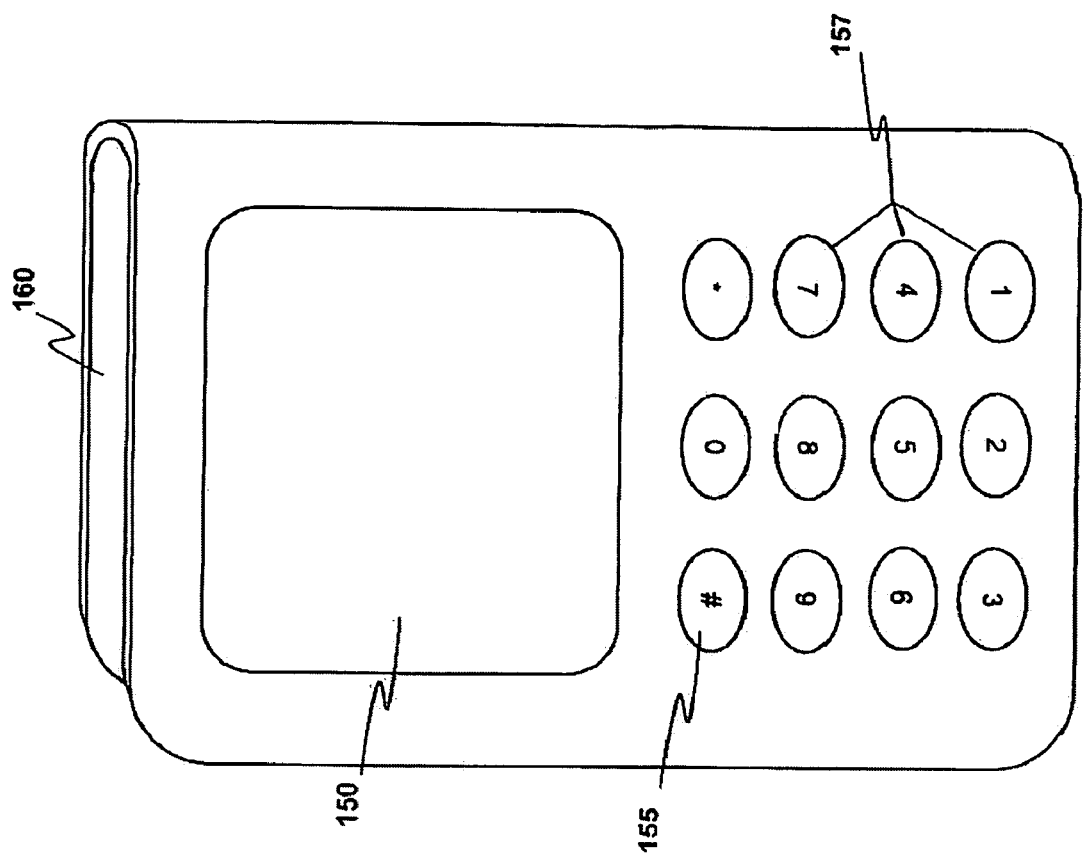
FIGS. 1A and 1B illustrate a body of a mobile communications device and an interchangeable covering for the mobile communications device, respectively, in accordance with one embodiment.
Figure 1A:
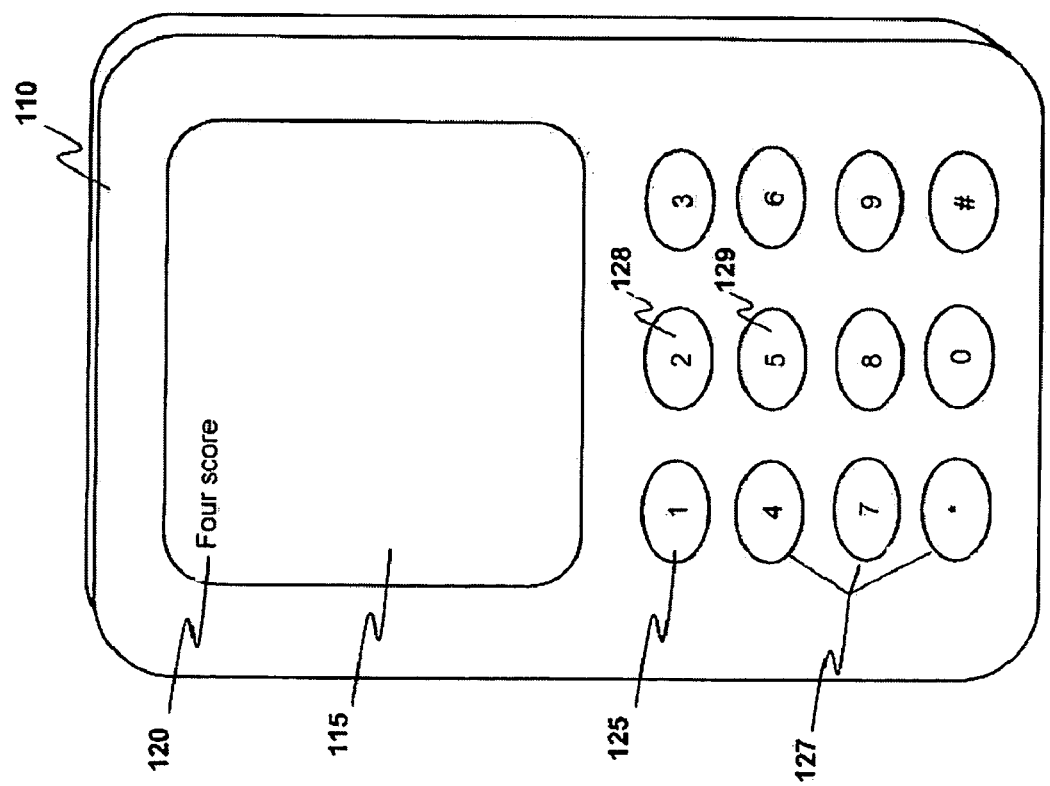

FIGS. 1A and 1B illustrate a body of a mobile communications device 110 and an interchangeable covering 160 for the mobile communications device 110, respectively, in accordance with one embodiment. Upon proper placement of the interchangeable covering 160 with respect to the mobile communications device 110, various aspects of the mobile communications device 110 or other components are modified to reflect a changed interaction mode.

The mobile communications device 110 encases a set of electronic components typically associated with a mobile communications device. The mobile communications device 110 includes a display device 115 and numeric keys 125 127. As shown in FIG. 1A, the mobile communications device 110 is in a default configuration, i.e. with numeric keys 125–127 complementing display device 115 from beneath. FIG. 1B illustrates an interchangeable covering 160 comprising, among other things, a display window 150 and a plurality of keycaps 155 157. The interchangeable covering 160 also contains electronic components (disposed "inside" the covering, not visible for the illustrated view). The electronic components within the interchangeable covering 160 act to at least facilitate redefining one or more aspects of the combined mobile communications and interchangeable covering device. The one or more aspects include at least re-orienting numeric keys 125–127 to complement display device 115 from a different orientation, e.g. from above.

This redefinition of aspects of the combined mobile communications and interchangeable covering device is accomplished, in some embodiments, by providing configuration data to the mobile communications device 110 by the interchangeable covering 160, to activate the alternate logic within mobile communication device 110. In other embodiments, the electronic components provide a portion of the logic to effectuate the redefinition, and data (such as, resource locators) to facilitate retrieval of the remaining needed logic to effectuate the redefinition. In these embodiments, mobile communication device 110 includes the capability of retrieving data from remote locations. In yet other embodiments, the electronic components include all the logic necessary to effectuate the redefinition.

Figure 2:
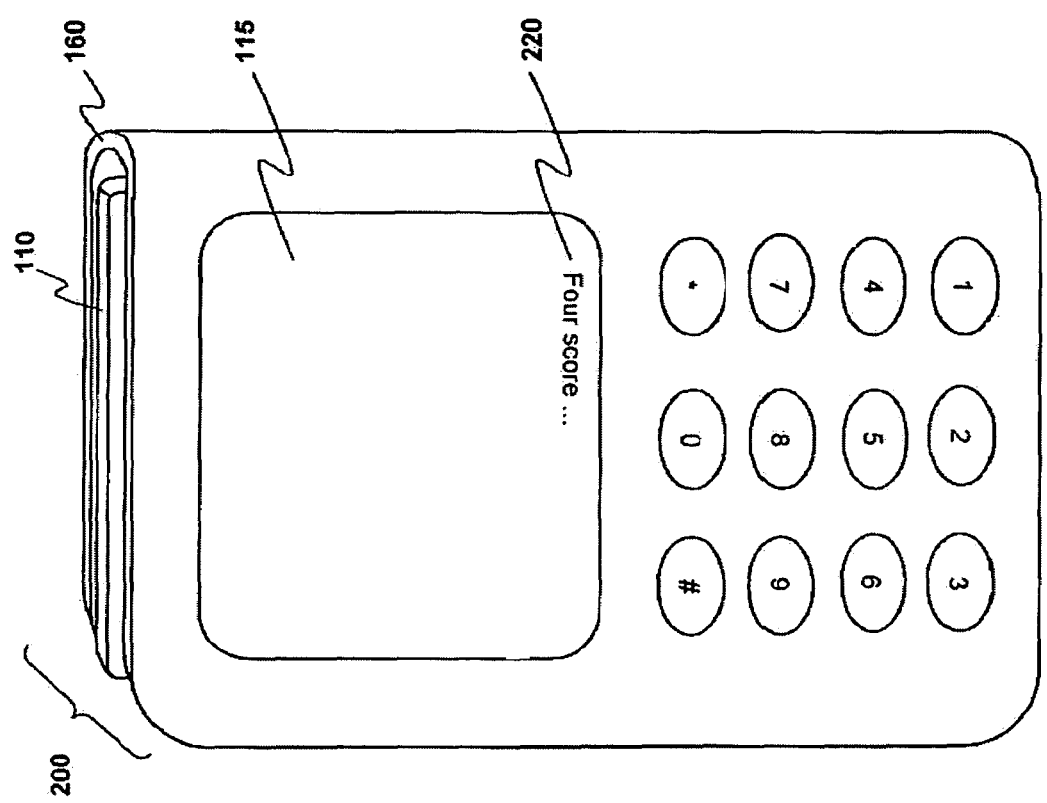
FIG. 2 illustrates a modified mobile communications device and the resultant reorientations, in accordance with one embodiment.

The interchangeable covering 160 is designed to at least partially cover the mobile communications device 110. In the embodiment illustrated in FIGS. 1A and 1B, the interchangeable covering 160 is designed to slide over the mobile communications device 110. When in place, with respect to the mobile communications device 110, the interchangeable covering 160 modifies the mobile communications device 110 to form a modified mobile communications device 200. FIG. 2 illustrates the mobile communications device 110 which has mated to it the interchangeable covering 160 to form a modified mobile communications device 200.

As shown in FIG. 2, the interchangeable covering 160 (through its features and embedded data/logic) modifies both the display of information on the display device 120 as well as the functions associated with the input keys 125 127. In one embodiment, the text displayed 120 on the display device 115 in the default configuration is shown displayed upright when the mobile communications device 110 is held in a manner such that the input keys 125 127 are disposed below the display device 115. Upon placement of the interchangeable covering 160 over the mobile communications device 110, the display of the text 220 on the display device 115 is reoriented. In addition, functions associated with the input keys 125 127 on the mobile communications device 110 are redefined by the interchangeable covering 160. For example, on the mobile communications device 110, key 125 has a function associated with it wherein, when pressed, a "1" will be entered into the presently active application of the mobile communications device 110. The interchangeable covering 160 contains keycaps 155 157, marked with the appropriate markings, to indicate the redefined function of the input keys 125 127 when the input keys 125 127 are pressed on the modified mobile communications device 200. That is, the keycaps 155 157 indicate what the corresponding redefined functions of the inputs keys 125 127 will be when the interchangeable covering 160 is in place with respect to the mobile communications device 110.

For example, when the interchangeable covering 160 is in place the function of the input key 125 is redefined. When in the default configuration, the function of the input key 125 is to enter a "1" into the present running application. However, under the redefinition of the function of the input key 125 that occurs as a result of the interchangeable covering 160, the function of the input key 125 is redefined such that, when pressed, a "#" is entered into the present running application. Similarly the other keys corresponding to the numeric key pay are mapped; e.g. 2, 3, 4, 5, 6, 7, 8, 9, *, 0, and # keys are mapped to #, 0, *, 9, 8, 7, 6, 5, 4, 3, and 2 keys, respectively.

In other embodiments, the interchangeable covering 160 contains substitute keys for the modified mobile communications device 200 instead of keycaps. For example, in one embodiment the input keys on the mobile communications device 110 comprise a QWERTY keyboard. In this embodiment, instead of providing keycaps 155 157 to cover the existing keys 125 127 of the mobile communications device 110, replacement keys are provided. In an embodiment where replacement keys are provided, the keys 125 127 of the mobile communications device 110 are disabled from supplying input to the modified mobile communications device 200. In this embodiment, the electronic components contained within the interchangeable covering 160 will also include the logic (or portion of the logic along with resource locators for locating the remaining logic) to support capturing key input from key presses of the keys on the interchangeable covering 160. The interface utilized to provide configuration data from the interchangeable covering 160 to the mobile communications device 110, as described below, can also be used to transfer the key input to the modified mobile communications device 200. In another embodiment, a second interface separate from the interface used to transfer the configuration data and/or logic from the interchangeable covering 160 to the mobile communications device 110 is used to transfer key input data from the interchangeable covering 160 to the mobile communications device 110.

Figure 3:
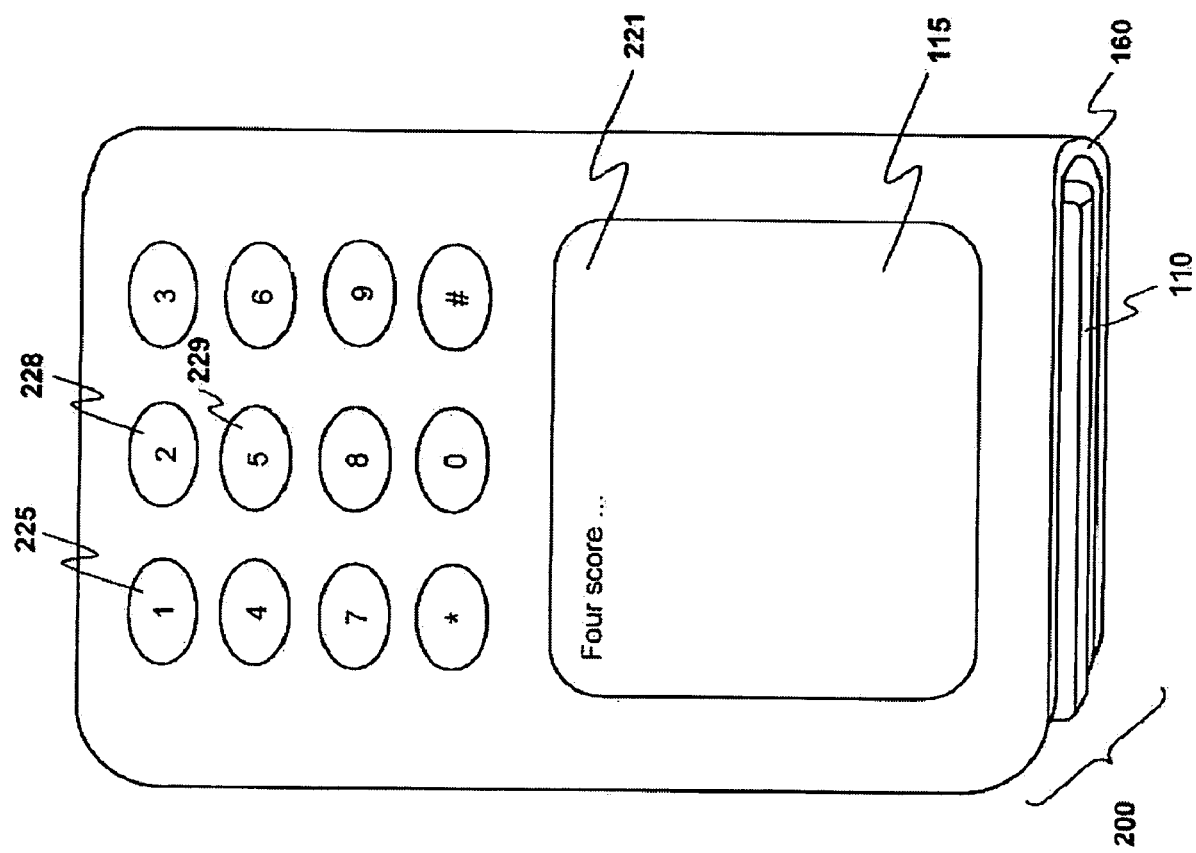
FIG. 3 illustrates the modified mobile communications device of FIG. 2 properly oriented for use.

FIG. 3 illustrates the modified mobile communications device 200 properly oriented for use. As shown by the arrows of FIG. 2, the modified mobile communications device 200 is properly oriented in a manner such that the mobile communications device 110 portion of the modified mobile communications device 200 is inverted relative to its orientation when properly oriented in the default configuration. In this modified configuration, the functions of the input keys 125 127, with the new keycap coverings 155 157, are modified in such a manner as to allow for input keys 125 127 with the same input function to be oriented the same relative to each other with the phone reoriented. For example, in the default configuration, input key 127, e.g. the "1" key, is to the left of input key 128 and above and to the right of input key 129. With the redefinition of the keys and the reorientation of the modified mobile communications device 200, the relative location of the "1" key 225 with respect to the other input keys 228 229 remains unchanged. As shown in FIG. 3, when the modified mobile communications device 200 is properly oriented, the display device 115 is located below the input keys 225–229. In addition, the text 221 is properly oriented with respect to the proper usage for the modified mobile communications device 200. Thus, in this embodiment, whereas the default input orientation of the inputs keys complements the default orientation from beneath, the interchangeable covering 160 reorients the input keys to complement the display orientation from above.

In another embodiment, a mobile communications device in the form of a wireless mobile phone contains a display device and input keys such that, when properly oriented in a default configuration, the input keys complement the display orientation from above. In this embodiment, an interchangeable covering reorients the inputs keys and display orientation such that, when properly oriented, the modified input keys complement the modified display orientation from below.

FIGS. 4A and 4B illustrate a top view of a mobile communications device 110 and an interchangeable covering 160, respectively, in accordance with one embodiment. The mobile communications device 110 has contact pads 435 attach to it for exchange of electronic data with interchangeable covering 160. These contact pads are connected to electronic components (not shown) contained within the mobile communications device 110. Similarly, interchangeable covering 160 also contains contact pads 425 such that, when slid in place around mobile communications device 110, both sets of contacts 425 435 mate. When the contacts mate 590, as shown in FIG. 5, data is communicated between electronic devices present in the mobile communications device 110 and electronic devices 420 in interchangeable covering 160.

Shown in FIG. 4B is an electronic device 420 containing configuration data regarding changes in functionality for the display device 115 and input keys 125 127 of the mobile communications device 110. In one embodiment, the electronic device 420 comprises a type of memory device; such as a subscriber identity module (SIM), a Read Only Memory (ROM), a Programmable Read Only Memory (PROM) device, a Electrically Erasable Programmable Read Only Memory (EEPROM) device and the like. In another embodiment, the electronic device 420 comprises another form of integrated circuit (IC) device such as a full custom IC, a central processing unit (CPU), a microcontroller, an Application Specific Integrated Circuit (ASIC), an Application Specific Standard Product (ASSP) and the like. In other embodiments, the electronic device is a combination of electronic devices.

In various embodiments of the invention, the interchangeable covering 160 contains a wraparound covering, covering multiple surfaces of mobile communication device 110, as shown in FIGS. 1–4. In alternate embodiments, the interchangeable cover incorporated with the teachings of the present invention may principally cover only one surface of mobile communication device 110, such as a front surface or a back surface.

While the term "cover" as used herein may come in a variety of embodiments, principally covering one or more surfaces of the mobile communication device, however, the term does not include, a "card" like part. That is, a part having the form factor of a "credit card", a PCMCIA card, a PC card, a Compact Flash card and so forth, is not a "cover", for the purpose of the present application. [PCMCIA=Personal Computer Memory Card International Association.]

In one embodiment, the interchangeable covering 160 comprises an ultra thin Liquid Crystal Display (LCD) display device in the display area 150 of the interchangeable covering 160. This LCD display device replaces the display device 115 of the mobile communications device 110 with that provided by interchangeable covering 160. In another embodiment, the interchangeable covering 160 contains a display area 150 either left open or comprised of a transparent material. In the former case, the display device 115 of the mobile communications device 110 is used as the display device of the modified mobile communications device. In such an embodiment, the data contained in the electronic component 420 of the interchangeable covering 160 operates to modify the information to be displayed on the display device 115 of the mobile communications device. For example, as shown in FIGS. 1A and 2, the text information that is to be displayed on display screen 120 is to be altered, e.g. reoriented. The altered text will be displayed in such a manner that, when viewed with the device "inverted" from its normal position, the text will appear in a proper viewing position.

Figure 6A:
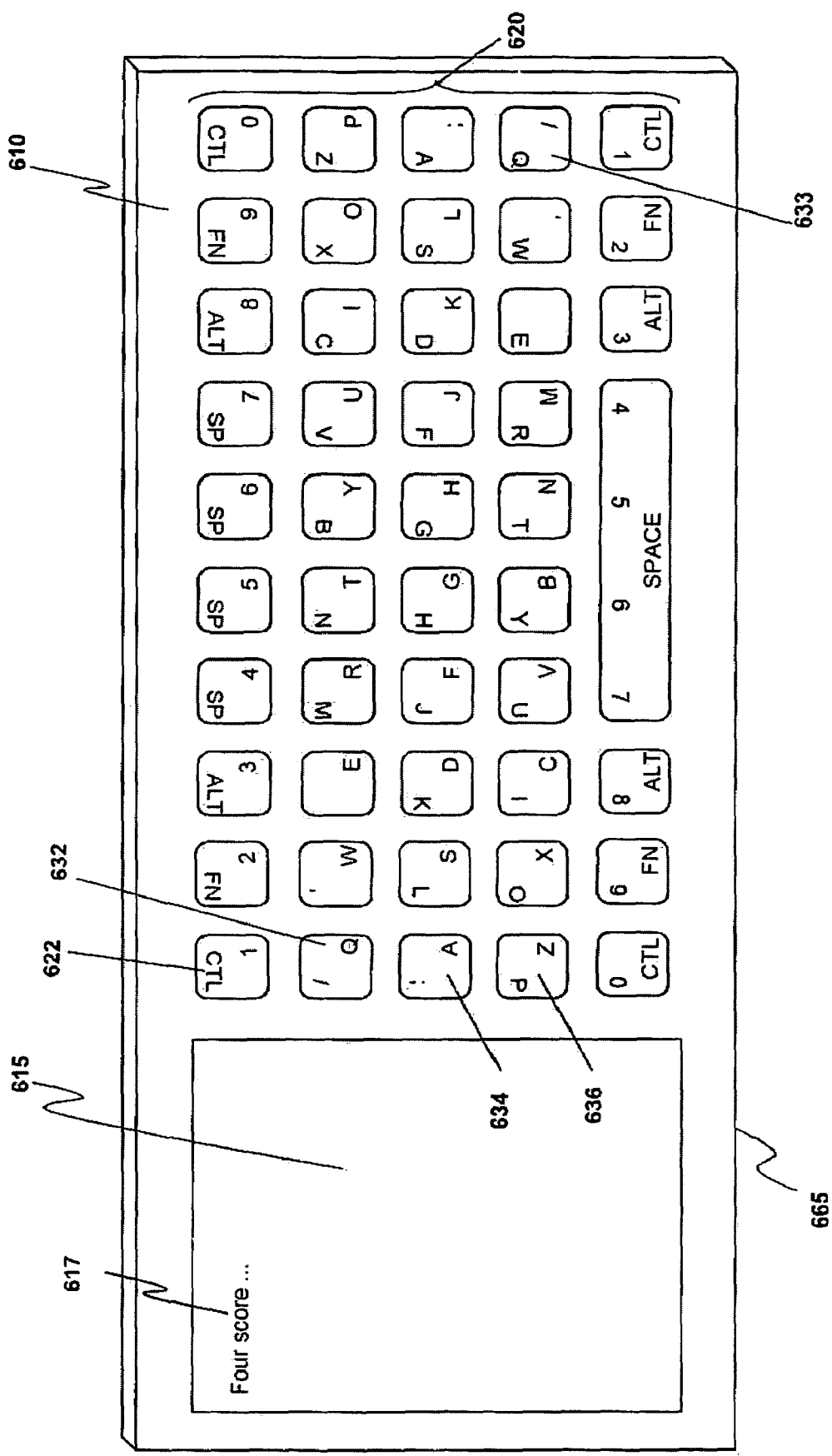
FIGS. 6A and 6B illustrate another embodiment of a mobile communications device and an interchangeable covering, respectively.
Figure 6B:
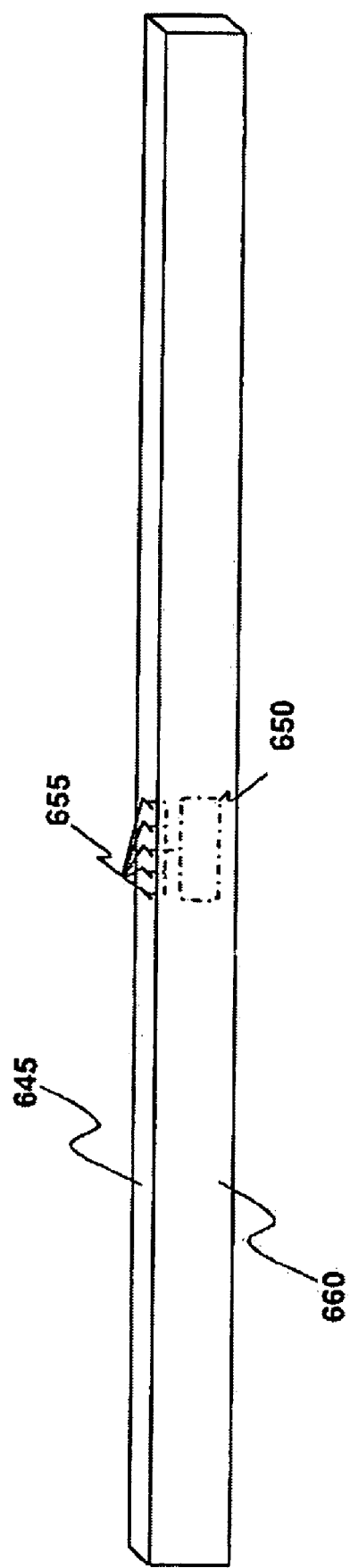

FIGS. 6A and 6B illustrate another embodiment of a mobile communications device 610 and an interchangeable covering 660, respectively. In this embodiment, mobile communications device 610 contains a display device 615 disposed to the left of input keys 620 in a default configuration. When the interchangeable covering 660 is connected to the mobile communications device 610, the display device 615 and input keys 620 have their functions redefined.

FIG. 6A illustrates a mobile communications device 610 containing a QWERTY keyboard 620, in accordance with one embodiment. In a default orientation such that the display device 615 is oriented to the left of the QWERTY keyboard 620, the top row of the keys contain default functions. These default functions, from left to right, are such that when key 622 is pressed, a value corresponding to a "1" is entered into the current application. Similar types of values are entered into the current application as the other keys are pressed. For example, the second row 632 of keys contains a standard QWERTY . . . functionality of a QWERTY keyboard, such that when one of these keys are pressed, the corresponding value is entered into the present application. Similarly the third row contains a standard "ASDFG . . . " functionality of a QWERTY keyboard. The fourth row contains a standard "ZXCVB . . . " functionality of a QWERTY keyboard. Finally, the fifth row in this embodiment illustrates a row containing a spacebar and additional special keys. This specific configuration is shown as an exemplary configuration. For example, in another embodiment, the top level numeric keys are not present. In this embodiment, the function associated with each key is marked in the lower right hand corner of the keycap.

FIG. 6B illustrates an interchangeable covering 660 in accordance with one embodiment. Note that, as illustrated in this embodiment, "covering" is only meant to imply a device that is cable of interfacing with the mobile communications device 610 so that a portion of the mobile communication device 610 is covered by the interchangeable covering 660. The interchangeable covering 660 contains electrical contacts 655 on side 645 of the interchangeable covering 660. These electrical contacts 655 are for interfacing with electrical contacts (not shown) on side 665 of the mobile communications device 610. The contacts on the interchangeable covering 660 are coupled to electronic components 650 which contain reconfiguration data for mobile communications device 610. In another embodiment, a contactless environment exists for transferring reconfiguration data from electronic components 650 to the mobile communications device 610. For example, in such an embodiment, contacts 655 are radio frequency (RF) transmitting antennas. These antennas send data at a sufficient power levels to RF receivers in the mobile communications device 610 that allow for the transfer of data to the mobile communications device 610 from the interchangeable covering 660.

Figure 7:
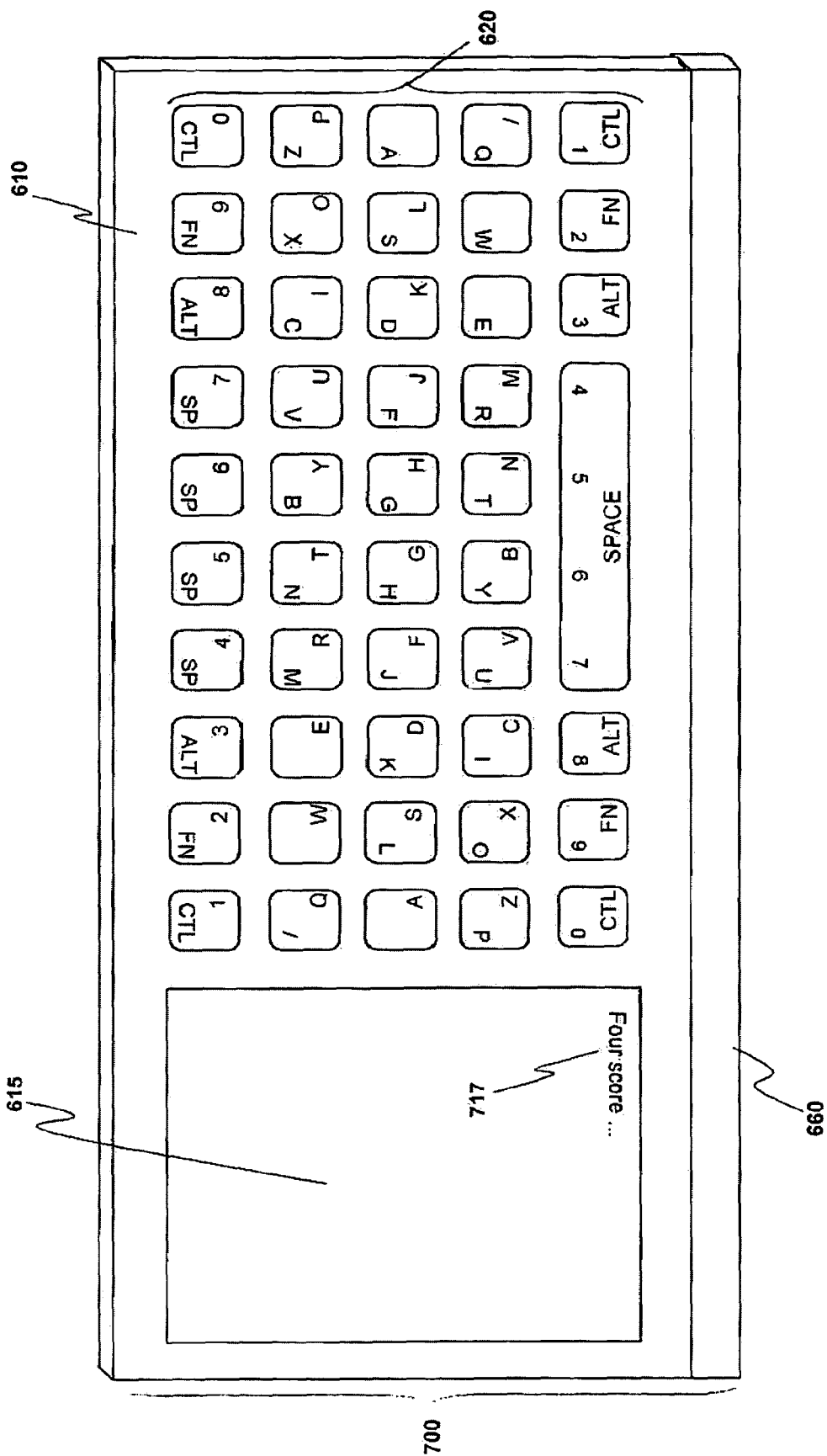
FIG. 7 illustrates a modified mobile communications device, in accordance with one embodiment.

FIG. 7 illustrates a modified mobile communications device 700, in accordance with one embodiment. This modified mobile communications device 700 comprises mobile communications device 610 modified by the reconfiguration data stored in the interchangeable covering 660. The reconfiguration data (or logic with or without complementary resource locators for additional logic) stored in electronic components 650 of the interchangeable covering 660 provides data and/or logic on the reconfiguration of the display orientation of text displayed on display device 615 relative to the input keys 620. As shown in FIG. 7, information displayed upright and at the top right of the screen 617 in a default orientation is shown "upside down" and at the bottom left of the screen 717 in the modified configuration.

In addition to facilitating the modification of the display of information on the screen 717, the configuration data provides information on the redefining of the functions of input keys 620 to the mobile communications device 610. For example, where as the first key on the second row 632 in the default configuration provides functionality such that pressing the key will input to the application a "Q", in the modified configuration same functionality will be provide by the last key on the forth row 633. The remaining keys are likewise redefined by the configuration data. In the embodiment shown, the keycaps contain labels indicating both key functionalities.

Figure 8:
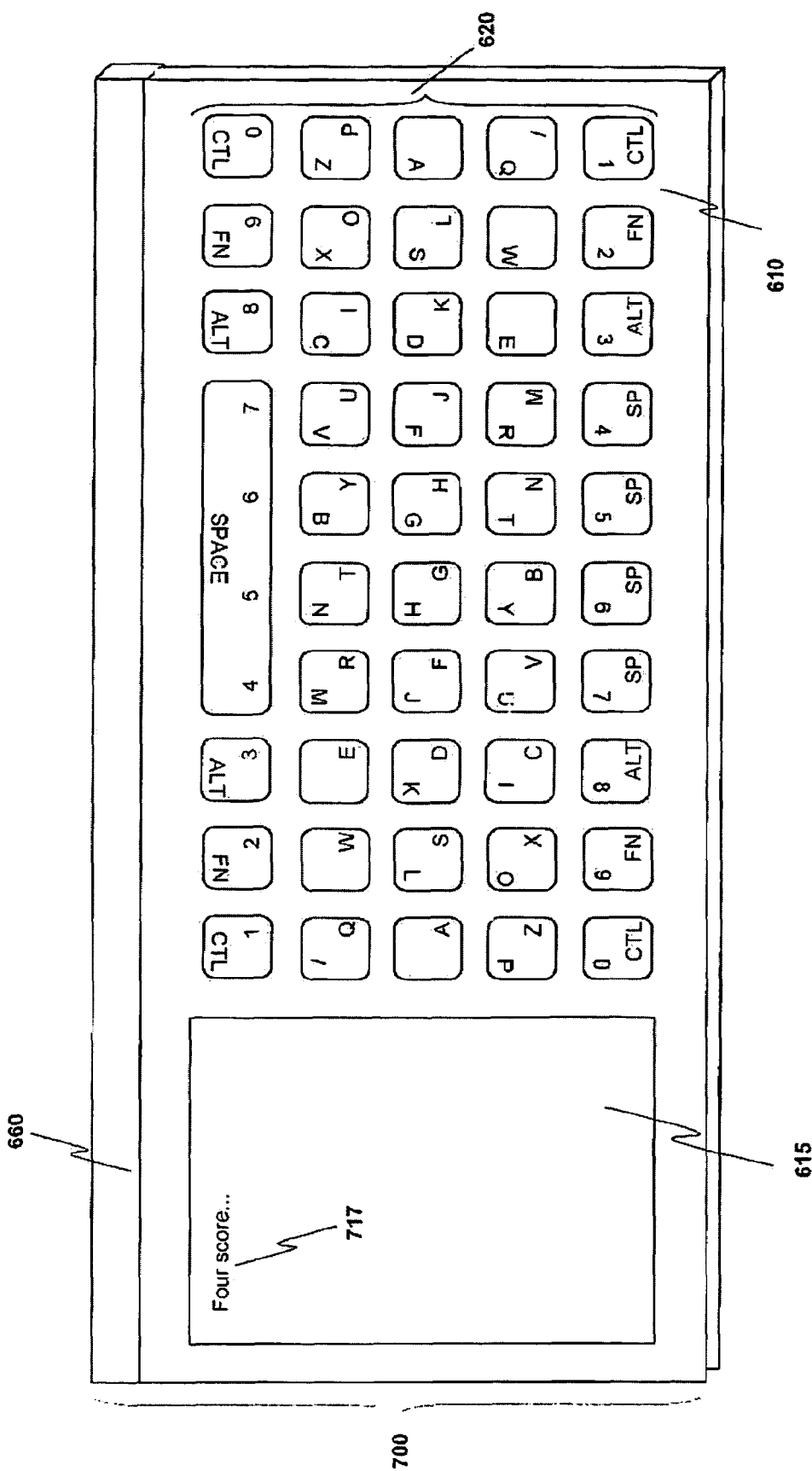
FIG. 8 illustrates the modified mobile communications device of FIG. 7 reoriented with the display device oriented to the right of the keypad.

FIG. 8 illustrates the modified mobile communications device 700 of FIG. 7 reoriented with the display device 615 oriented to the right of the QWERTY keypad 620. As shown, the modified display of information 617 appears properly oriented with this orientation of the modified mobile communications device 700. In addition, in this embodiment, the key cap markings are such that the input keys display, in the lower right hand corner, the proper function of the input keys. Thus, in this embodiment, by modifying the mobile communications device 610 with the interchangeable covering 660, effectively a mobile communications device with a left hand oriented display can be transformed into a mobile communications device with a right hand oriented display device.

In another embodiment, a mobile communications device in the form of a person digital assistant (PDA) contains a right hand oriented display device. In this embodiment, the mobile communications device can be modified by an interchangeable covering to provide a modified mobile communications device with a left hand oriented display device.

In another embodiment, the keypads are a touch sensitive LCD display device. The LCD display is capable of showing the properly defined values for present keypad definitions.

FIG. 9A illustrates a mobile communications device 910, in accordance with one embodiment. FIGS. 9B and 9C illustrate an interchangeable covering 920 for the mobile communications device 910 of FIG. 9A. FIG. 9B illustrates the face side of the interchangeable covering 920. FIG. 9C illustrates the back side of the interchangeable covering 920 that will mate with the mobile communications device 910. The mobile communications device contains a numeric input keypad 970 and a display device 980. In a default configuration, the numeric input keypad 970 and its constituent keys complement the orientation of the display device 980. As shown in FIG. 9A, the mobile communications device 910 is oriented with the numeric input keypad 970 above the display device 980 with the display device 980 displaying text 985 that is properly oriented for a conventional user of the mobile communications device 910.

The mobile communications device 910 contains attachment points 930 for attachment of an interchange covering 920. As shown in FIG. 9C, the back side of interchangeable covering 920 has complementary attachment points 932 for attachment to the mobile communications device 910. In this embodiment, the mobile communications device 910 contains two sides which have a curvature 912 914. Similarly, the interchangeable covering comprises sides with curvatures 922 924. The mobile communications device 910 contains a contactless coupler 940 to facilitate transfer of configuration data (or logic with or without complementary resource locators for additional logic) from the interchangeable covering 920. In this embodiment, the contactless coupler contains an RF transceiver for communication with the interchangeable covering 920. The interchangeable covering 920 also contains a complementary contactless coupler comprising a transceiver 945 to facilitate transfer of configuration data to the mobile communications device 910.

Figure 10B:
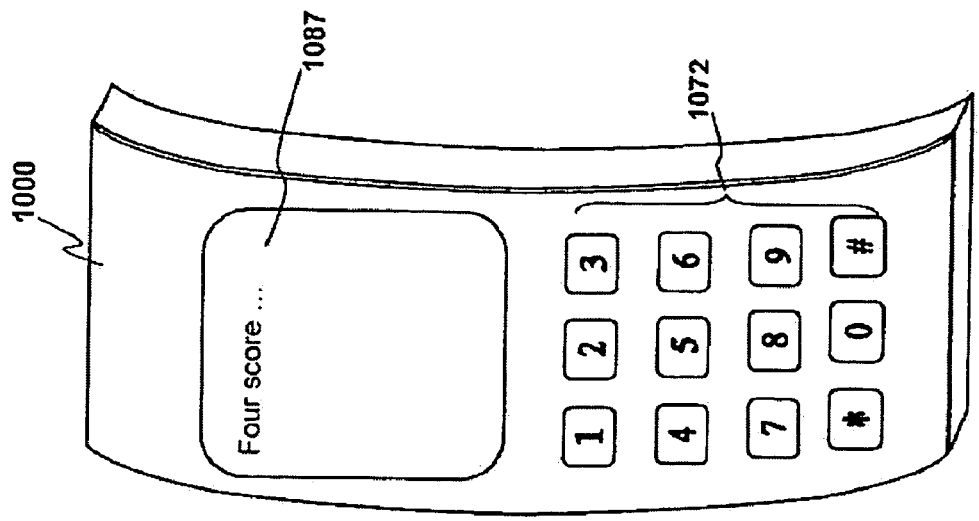
FIGS. 10A and 10B illustrate a modified mobile communications device resulting from the mobile communications device and interchangeable coverings of FIGS. 9A–9B.
Figure 10A:
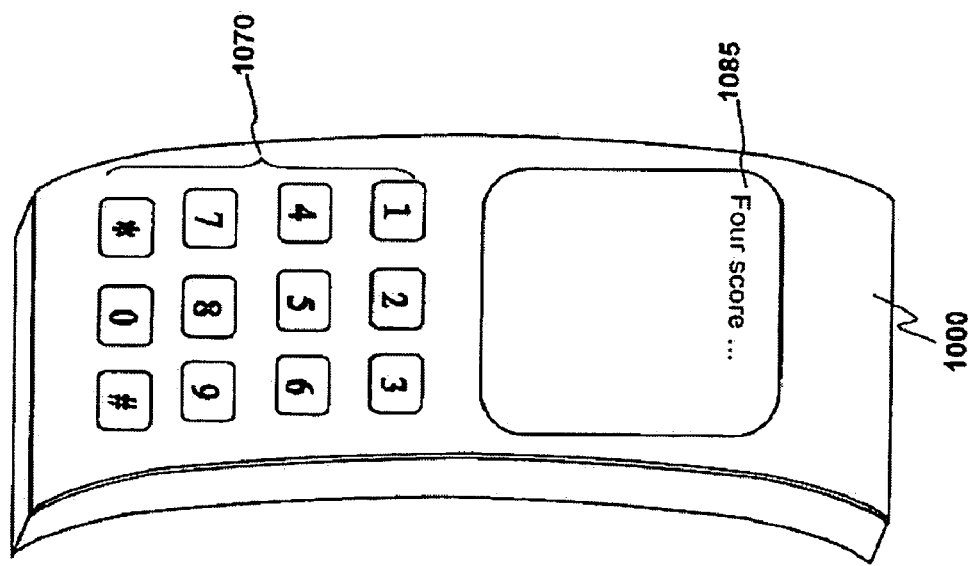

FIGS. 10A and 10B illustrate a modified mobile communications device 1000. This modified mobile communications device 1000 is the result of the reorientation of the display and the key functions of mobile communications device 910 in view of the configuration data transferred from the interchangeable covering 920. FIG. 10A illustrates the reoriented display test 1085 and key functions 1070. FIG. 10B illustrates the device in an inverted orientation such that the device has proper display 1087 and keypad 1072 orientation to facilitate use of the modified mobile communications device 1000 by a user.

Figure 11:
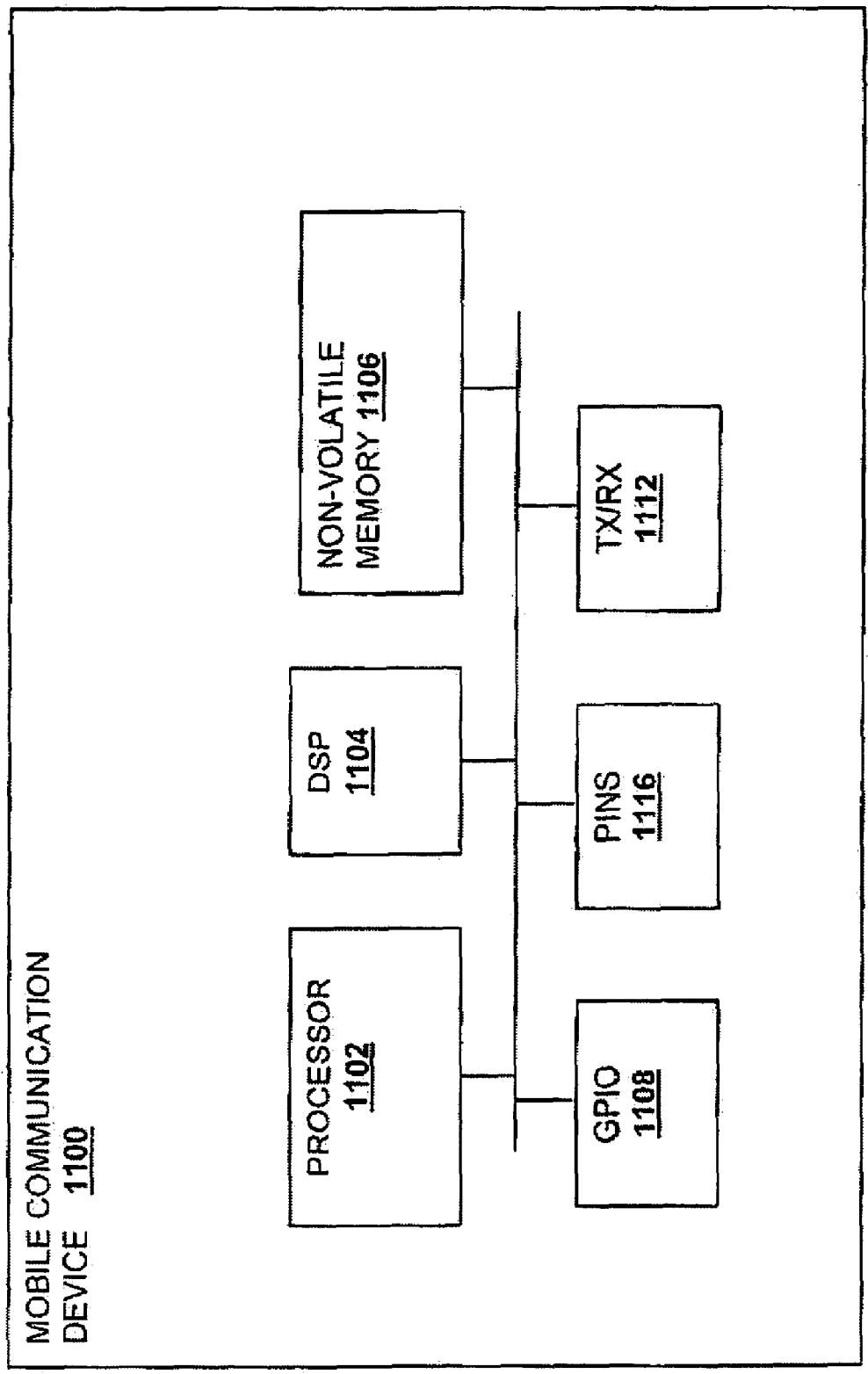
FIG. 11 illustrates an architectural view of one embodiment of a personal electronic device in the form of a mobile communication device incorporating the teachings of the present invention.

FIG. 11 illustrates an architectural view of one embodiment of a mobile communications device compatible with the teachings of the present invention. As illustrated, mobile communication assembly 1100 includes elements found in conventional mobile communication devices, such as processor 1102, digital signal processor (DSP) 1104, non-volatile memory 1106, and general-purpose input/output (GPIO) interface 1108. For the illustrated embodiment, mobile communication device 1100 also advantageously includes contact pins 1116 forming an interface to facilitate transfer of data to and from interchangeable covering 160. However, in other embodiments mobile communication device 1100 may advantageously include transmit/receive logic 1112 (in place of, or in addition to contact pins 1116)

to form a contactless interface to facilitate transfer of data to and from interchangeable covering 920.

Figure 12:
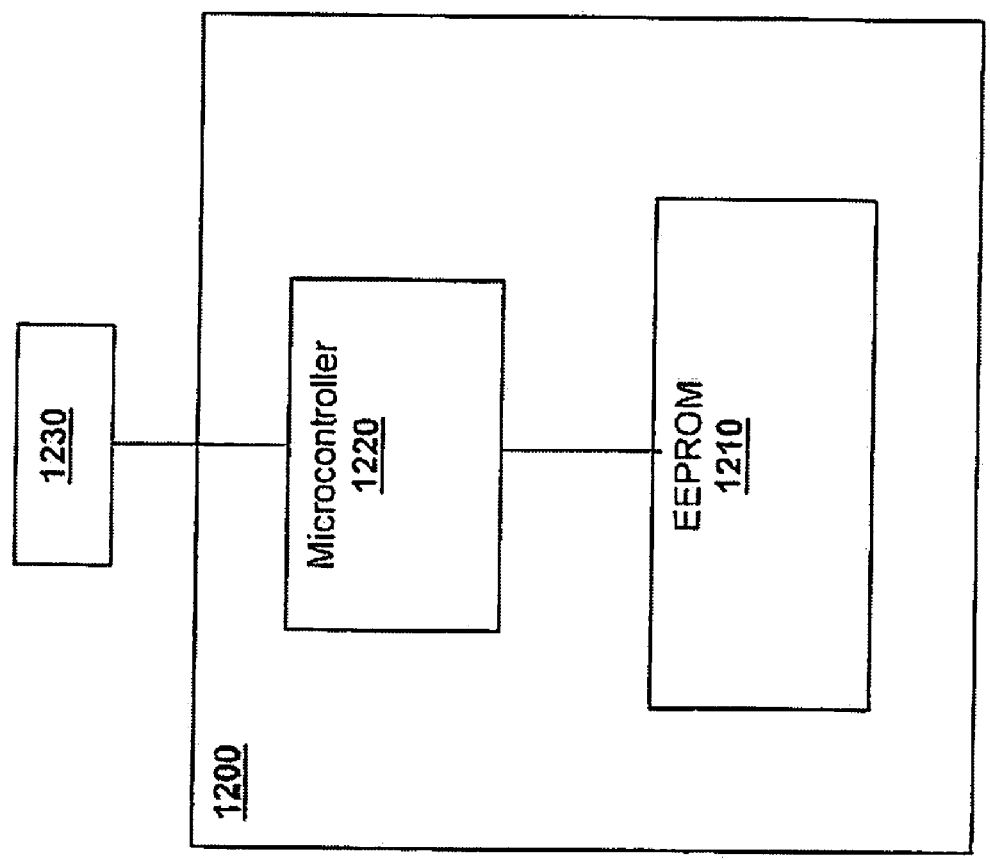
FIG. 12 illustrates an electronic component of an interchangeable covering, in accordance with one embodiment.

FIG. 12 illustrates an electronic component 1200 of an interchangeable covering, in accordance with one embodiment. Electrically Erasable Programmable Read Only Memory (EEPROM) device 1210 contains configuration data (or logic with or without complementary resource locators for additional logic) programmed into it. In this embodiment, an embedded controller 1220 reads configuration data from EEPROM device 1210. The embedded controller 1220 will provide the mobile communications device with the configuration data (or logic with or without complementary resource locators for additional logic) read from the EEPROM device 1210. The embedded controller 1220 provides in the information to the mobile communications device through contact pads 1230 on the interchangeable covering.

In one embodiment, the user of the modified mobile communications device has the ability to reconfigure functions associated with input keys. In such an embodiment, the microcontroller 1220 can be used to write the new configuration data to the EEPROM 1230.

Figure 13:
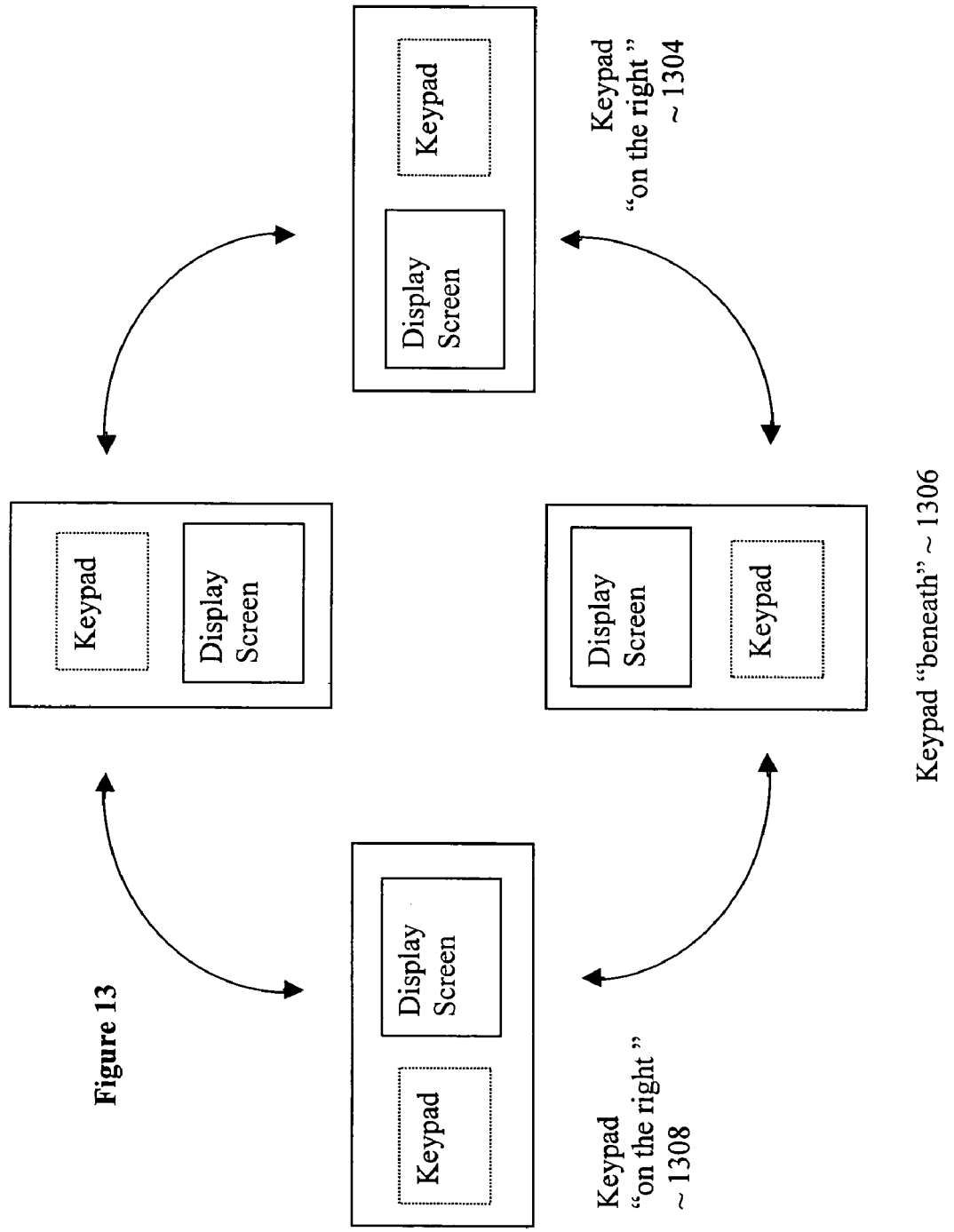
FIG. 13 illustrates other possible redefinitions and reorientations of the input keypad and display screen of a mobile communication device, in accordance with various alternate embodiments.

FIG. 13 illustrates various other redefinitions and reorientations of the input keypad and display screen of a mobile communication device, in accordance with various alternate embodiments. As illustrated, in addition to the employment of an interchangeable cover, with key caps with different labels or a replacement keypad, and a corresponding display opening, transparent window or a replacement display (hereinafter, simply COVER) to redefine and reorient the input keypad and the display screen of a mobile communication device from (a) a keypad "on top" orientation 1302 to or keypad "beneath" orientation 1306, or vice versa, or (b) from a keypad "on the left" orientation 1308 to a keypad "on the right" orientation 1304, or vice versa, COVER may be employed to redefine and reorient the input keypad and the display screen of a mobile communication device (c) from a keypad "on top" orientation 1302 to or keypad "on the right" 1304 or keypad "on the left" orientation 1308, (d) from a keypad "on the right" orientation 1304 to or keypad "on top" 1302 or keypad "beneath" orientation 1306, (e) from a keypad "beneath" orientation 1306 to or keypad "on the right" 1304 or keypad "on the left" orientation 1308, (f) from a keypad "on the left" orientation 1308 to or keypad "on top" 1302 or keypad "beneath" orientation 1306.

In other words, COVER in addition to being able to be employed to redefine and reorient a keypad and a display screen of a mobile communication device from a first complementary orientation to a second complementary orientation that is substantially 180 degrees rotated from the first complementary orientation, COVER may be employed to redefine and reorient a keypad and a display screen of a mobile communication device from a first complementary orientation to a second complementary orientation that is substantially 90 degrees rotated (also referred to as an orthogonal complementary orientation).

Moreover, COVER, in particular, the type with a replacement keypad, in addition to being able to be employed to redefine numeric keys of a numeric keypad or alphanumeric keys of a QWERTY keyboard, such COVER may be employed to replace a numeric keypad with a QWERTY keyboard or vice versa.

As can be seen from the above description, a novel design is proposed for a mobile communication device. This device allows for the reorientation of the mobile communication device. The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. In particular, while the present invention has been described with mobile communication devices having "uni-bodies", the present invention may also be practiced on mobile communication devices having multi-part or portion bodies, such as a wireless mobile phone of the "flip" type, commonly referred to as a "flip" phone.

These modification can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with establish doctrines of claim interpretation.

The invention claimed is:

1. An apparatus comprising:
a first set of at least one electronic component;
a body encasing said first set of at least one electronic component;
a display screen disposed on said body and coupled to said first set of at least one electronic component;
a first plurality of alphanumeric input keys disposed on said body and coupled to said first set of at least one electronic component, each of said plurality of alphanumeric input keys having a default alpha or numeric input function, or both, and designed to be used in a default input orientation complementary to a default display orientation for displaying information on the display screen, with the first alphanumeric input keys and the display screen having a first operational relative disposition; and
an interchangeable cover, designed to at least partially cover said body including at least one of said first plurality of alphanumeric input keys, the interchangeable cover having a second set of at least one electronic component embedded within said interchangeable cover, and at least data stored in said second set of at least one electronic component to, at least in part, facilitate redefining the alpha or numeric input function, or both, of at least one of said first alphanumeric input keys and re-orienting the display of information on the display screen and the first alphanumeric input keys to a second complementary orientation that is substantially orthogonal to the default complementary orientation, with the first alphanumeric input keys and the display screen having a second operational relative disposition that is different from the first operational relative disposition.

2. The apparatus of claim 1, wherein the default definition and input orientation of the first plurality of alphanumeric input keys complement the default display orientation of displaying information on the display screen from a selected one of beneath and above, and the first alphanumeric input keys are effectively redefined and re-oriented to complement the displaying of information on the display screen from a selected one of a left side and a right side of the display screen or the unselected one of the above and beneath, after attachment of the interchangeable cover.

3. The apparatus of claim 1, wherein the default input orientation of the first plurality of alphanumeric input keys complements the default display orientation of displaying information on the display screen from a selected one of a left side and a right side, and the first alphanumeric input keys are effectively redefined and re-oriented to complement the displaying of information on the display screen from a selected one of above and beneath of the display screen, or the unselected of the left side and right side, after attachment of the interchangeable cover.

4. The apparatus of claim 1, wherein the interchangeable cover further comprises a plurality of alphanumeric key caps corresponding to the first plurality of alphanumeric keys, the plurality of alphanumeric key caps having labels that facilitate said redefinitions and reorientations.

5. The apparatus of claim 1, wherein the interchangeable cover further comprises a second plurality of alphanumeric keys superseding the first plurality of alphanumeric keys, to facilitate said redefinitions and reorientations.

6. The apparatus of claim 5, wherein the first plurality of alphanumeric keys form a selected one of a numeric keypad and a QWERTY key pad, and the second plurality of alphanumeric keys form the other one of the a numeric keypad and a QWERTY key pad.

7. The apparatus of claim 1, wherein the interchangeable cover further comprises a selected one of an opening and a transparent window corresponding to the display screen to enable the display screen to be visible even after attachment of the interchangeable cover.

8. The apparatus of claim 1, wherein the interchangeable cover further comprises another display screen to supersede the display screen.

9. The apparatus of claim 1, wherein the apparatus is a selected one of a wireless mobile phone and a personal digital assistant.

10. A mobile communications device comprising:
means for displaying information on a screen of a first assembly;
means for receiving alpha or numeric input, or both, from a plurality of alphanumeric input keys of the first assembly; and
means for receiving configuration data from a second assembly, wherein the configuration data contribute at least in part to cause the plurality of alphanumeric input keys to be redefined from a first definition having a first orientation to complement a first display orientation of information on the display means, with the alphanumeric input keys and the display means having a first operational relative disposition, to a second definition having a second orientation to complement a second display orientation of information on the display means, the first and second orientations are orthogonal or opposite to each other, with the alphanumeric input keys and the display means having a second operational relative disposition that is different from the first operational relative disposition.

11. A wireless mobile phone comprising:
a first set of at least one electronic component;
a body encasing said first set of at least one electronic component;
a display screen disposed on said body and coupled to said first set of at least one electronic component;
a first plurality of alphanumeric input keys disposed on said body and coupled to said first set of at least one electronic component, each of said plurality of alphanumeric input keys having a default alpha or numeric input function, or both, and designed to be used in a default input orientation complementary to a default display orientation of displaying information on the display screen, with the first alphanumeric input keys and the display screen having a first operational relative disposition; and
an interchangeable cover, designed to at least partially cover said body including at least one of said first plurality of alphanumeric input keys, the interchangeable cover having a second set of at least one electronic component embedded within said interchangeable cover, and at least data stored in said second set of at least one electronic component to, at least in part, facilitate redefining the alpha or numeric function, or both, of at least one of said first alphanumeric input keys and re-orienting the display of information on the display screen and the first alphanumeric input keys, to a second complementary orientation that is orthogonal or opposite to the default complementary orientation, with the first alphanumeric input keys and the display screen having a second operational relative disposition that is different from the first operational relative disposition.

12. The apparatus of claim 11, wherein the default input orientation of the first plurality of alphanumeric input keys complements the default display orientation of displaying information on the display screen from a selected one of above and beneath, and the first alphanumeric input keys are effectively re-oriented to complement the displaying of information on the display screen from a selected one of a left side and a right side of the display screen, or the unselected one of above and beneath, after attachment of the interchangeable cover.

13. The apparatus of claim 11, wherein the default input orientation of the first plurality of alphanumeric input keys complements the default display orientation of displaying information on the display screen from a selected one of a left side and a right side, and the first alphanumeric input keys are effectively re-oriented to complement the displaying of information on the display screen from a selected one of above and beneath the display screen, or the unselected one of the left side and right side, after attachment of the interchangeable cover.

14. The wireless mobile phone of claim 11, wherein said wireless mobile phone comprises a plurality of body portions, and said body is a first of said body portions.

15. An interchangeable cover comprising:
a non-card type cover body; and
an electronic component disposed on a surface of the cover body, having data or logic to at least contribute to causing one or more alphanumeric input keys of a mobile communication device mated with the interchangeable cover to be redefined and reoriented to complement displaying of information on a display of the wireless communication device in a reoriented manner that is orthogonal to an original orientation, the one or more alphanumeric input keys having a first operational definition and a first operational relative disposition with the display, prior to attachment of the interchangeable cover, and having a second operational definition that is different from the first operational definition, and a second operational relative disposition with the display that is different from the first operational relative disposition, after attachment of the interchangeable cover.

16. The interchangeable cover of claim 15, wherein the electronic component comprises data or logic to at least contribute to redefining and reorienting the one or more alphanumeric input keys to complement displaying of information on the display from an initial selected one of above and beneath orientation to a reoriented selected one of a left side and a right side orientation.

17. The interchangeable cover of claim 15, wherein the electronic component comprises data or logic to at least contribute to redefining and reorienting the covered one or more alphanumeric input keys to complement displaying of information on the display from an initial selected one of a left side and a right side orientation to a reoriented selected one of above and beneath orientation.

18. The apparatus of claim 15, wherein the interchangeable cover further comprises a plurality of alphanumeric key caps corresponding to the first plurality of alphanumeric keys, the plurality of alphanumeric key caps having labels that facilitate said redefinitions and reorientations.

19. The apparatus of claim 15, wherein the interchangeable cover further comprises a second plurality of alphanumeric keys superseding the first plurality of alphanumeric keys, to facilitate said redefinitions and reorientations.

20. The apparatus of claim 19, wherein the first plurality of alphanumeric keys form a selected one of a numeric keypad and a QWERTY keypad, and the second plurality of alphanumeric keys form the other one of the numeric keypad and the QWERTY keypad.

21. The apparatus of claim 15, wherein the interchangeable cover further comprises a selected one of an opening and a transparent window corresponding to the display screen to enable the display screen to be visible even after attachment of the interchangeable cover.

22. The apparatus of claim 15, wherein the interchangeable cover further comprises another display screen to supersede the display screen.

23. The interchangeable cover of claim 15, wherein the cover body is substantially U-shaped.

24. The interchangeable cover of claim 15, wherein the cover body is a selected one of a non-card type front plate and a non-card type back plate.

* * * * *